June 28, 1938. G. ÖRSTRÖM 2,121,926
MACHINE FOR CLOSING BAGS
Filed Sept. 22, 1936 10 Sheets-Sheet 1

FIG.1

Inventor,
Gustaf Örström
By Sommers & Young
Attys.

June 28, 1938.  G. ÖRSTRÖM  2,121,926

MACHINE FOR CLOSING BAGS

Filed Sept. 22, 1936  10 Sheets-Sheet 8

Inventor
Gustaf Örström
By Sommers & Young
Attys

June 28, 1938. G. ÖRSTRÖM 2,121,926
MACHINE FOR CLOSING BAGS
Filed Sept. 22, 1936 10 Sheets-Sheet 9

FIG. 18

Inventor
Gustaf Örström
By Sommers + Young
Attys.

Patented June 28, 1938

2,121,926

UNITED STATES PATENT OFFICE 2,121,926

MACHINE FOR CLOSING BAGS

Gustaf Örström, Alsten, Sweden, assignor to Aktiebolaget Gerh. Arehns Mekaniska Verkstad, Stockholm, Sweden, a Swedish joint-stock company Application September 22, 1936, Serial No. 102,045
In Sweden September 27, 1935

9 Claims. (Cl. 93—6)

This invention relates to a machine for closing bags and it is a main object of my invention to provide means for careful control of the bag end when handling it to obtain a coiled bag closure.

Another object of my invention is to provide an improved machine for producing very regularly shaped and smooth coiled bag closures.

Further objects of my invention will appear from the following description when read in connection with the accompanying drawings showing an illustrative embodiment of the invention and wherein:—

Figure 1:
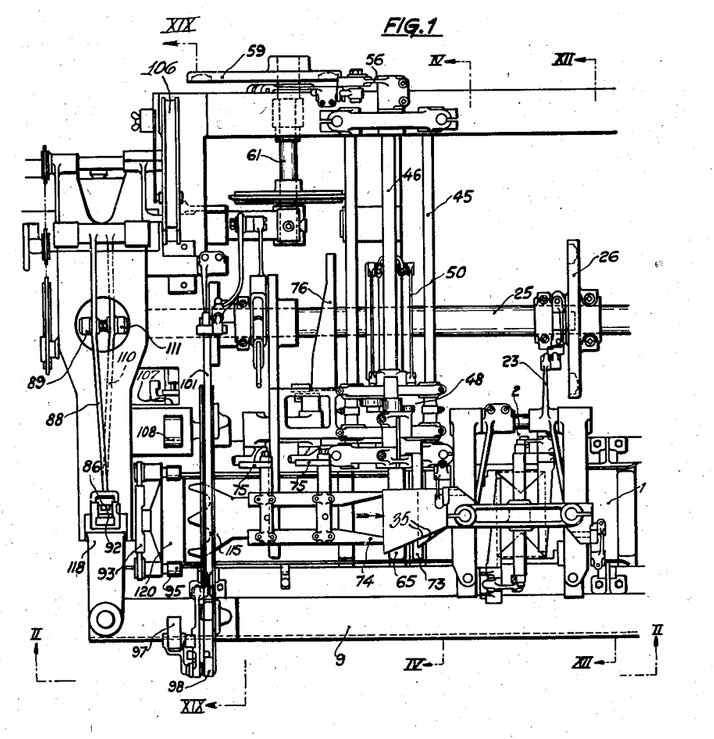
Fig. 1 is a plan view of the part of the machine comprising the relevant features of the invention.
Figures 2, 3:
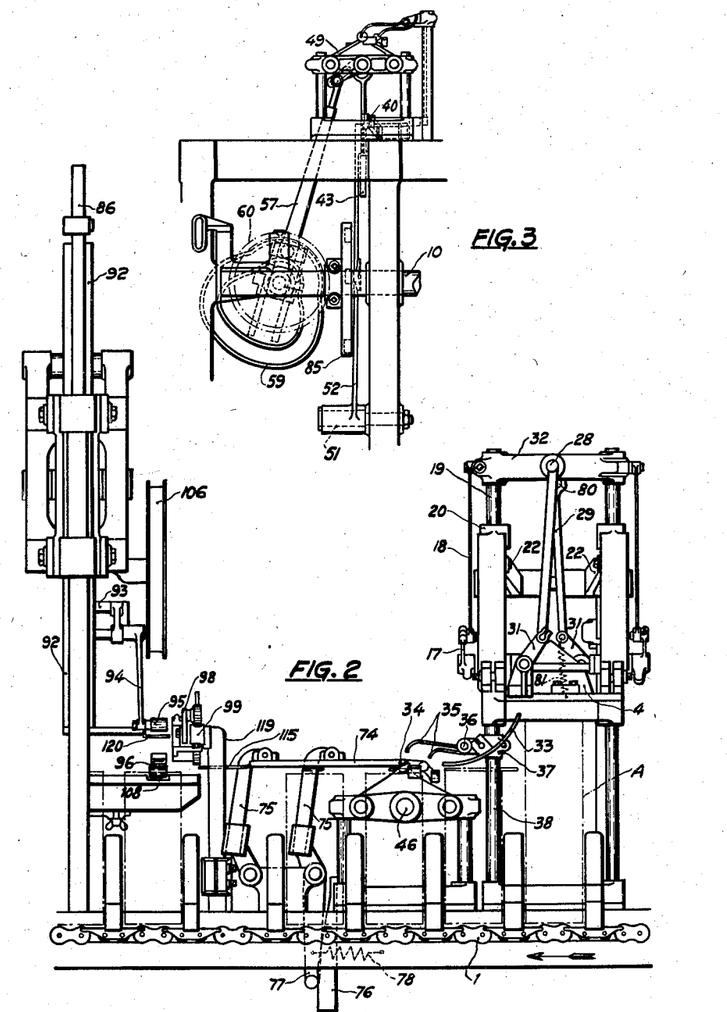
Fig. 2 shows a front elevation viewed in the direction II—II of Fig. 1.
Fig. 3 is a front view of means for coiling the bag end.

Referring to the drawings, the open, filled bags A are moved by the conveyor 1 stepwise in the direction of the arrow (Fig. 2) into a position below a folding device 2 (Fig. 1). There the bag is raised by means of a lifting piston 3 (Fig. 12) through a funnel-shaped frame 4 (Fig. 2) to the position shown in Figs. 14 and 15, so that, if the bag is provided with folding creases the lowermost crease extending around the bag is at a level with the upper edge 5 of the frame.

Figure 12:
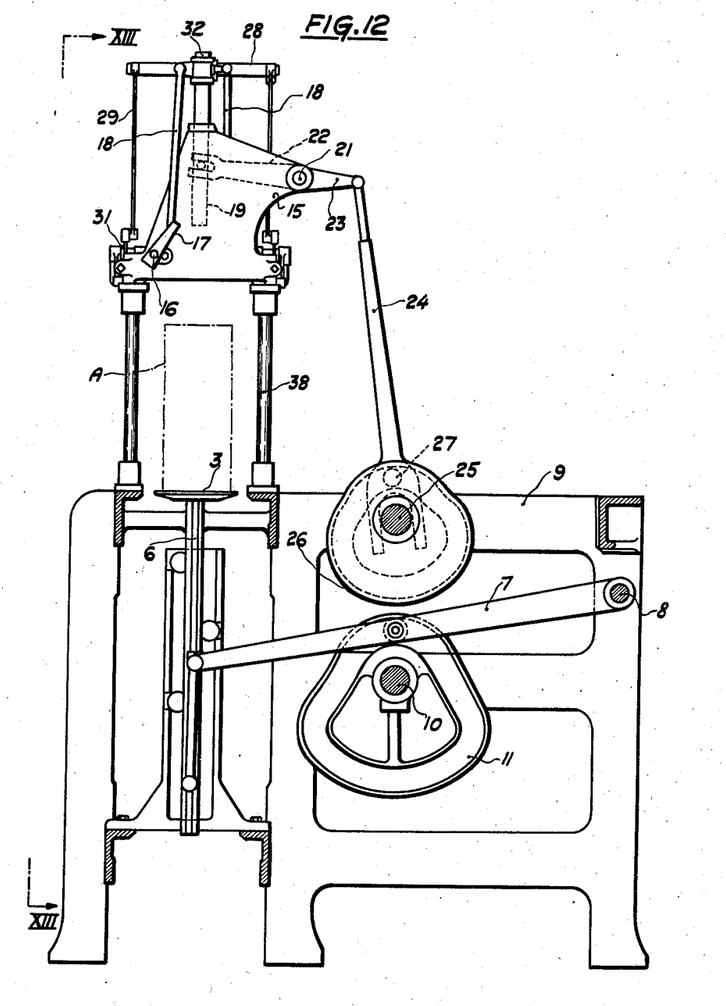
Fig. 12 is a sectional view taken on the line XII—XII in Fig. 1.
Figure 13:
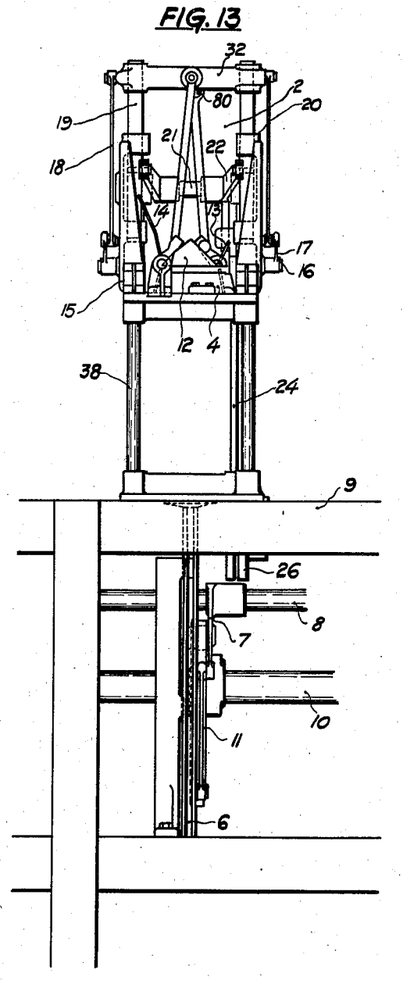
Fig. 13 is an elevational view in the direction XIII—XIII in Fig. 12.

The lifting piston 3 is supported by a rod 6 which is pivotally connected to an arm 7 pivotally journalled on a pin 8 in the machine frame 9. On a driving shaft 10 journalled in the machine frame is fixed a cam disc 11 which imparts to the arm 7 and thereby to the lifting piston 3 periodical movements up and down.

At the upper edge of the frame 4 are pivotally journalled a pair of oppositely disposed tucking flaps 12, a rear bag collapsing flap 13 and a front one 14. The flaps 12 are each secured to a pin 16, rotatably journalled in the frame 15. The frame 15 is secured to columns 38. To each pin 16 is secured an arm 17 which is pivotally connected to a link 18. Both the links 18 are pivoted to a yoke 32, which is secured to two spindles 19, which are movable up and down in guides 20 on the frame 15. In the frame 15 is turnably journalled a shaft 21, to which are secured two arms 22, which by means of forks are pivotally connected each to one of the spindles 19. One of the arms 22 is developed as a lever, the other arm 23 of which is pivoted to one end of a link rod 24, the other end of which embraces a shaft 25, rotatably journalled in the machine frame. To the shaft 25 is secured a cam disc 26, arranged at rotation to actuate the roller 27, journalled on the rod 24, and thereby impart to the rod periodical up and down movements. The yoke 32 is provided with laterally projecting arms 28, to which are pivotally connected links 29. Each link 29 is pivoted to an arm 31. The arms 31 are each connected with one of the collapsing flaps 13 and 14. The upper end of the link, connected to the flap 13 is provided with an oblong slot 80, which embraces the arm 28, and one of the arms 31, that is connected to said flap, is urged downwardly by tension spring 81 (Fig. 2), so that the corresponding link 29 is pulled down so far as the arm 28 permits.

Figure 4:
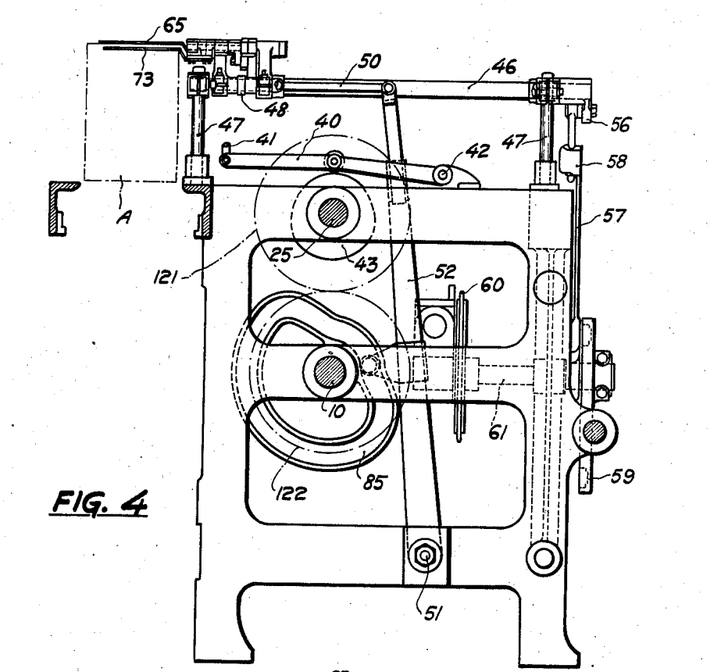
Fig. 4 shows an elevational section taken on the line IV—IV of Fig. 1 with certain parts removed.
Figure 5:
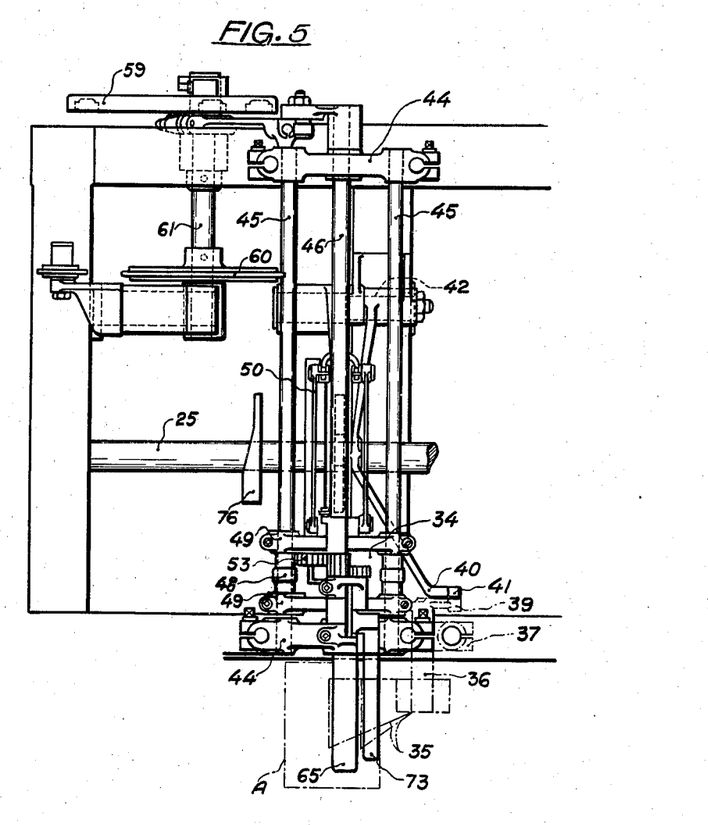
Fig. 5 is a plan view of the parts shown in Fig. 4.
Figure 14:
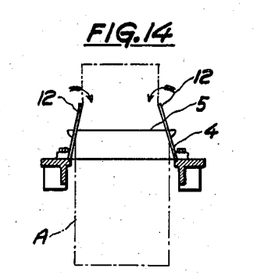
Figs. 14 and 15 show sections taken at right angles to one another of a detail of the device according to Fig. 13.
Figure 15:
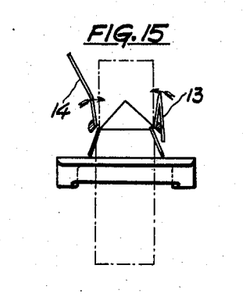
Figure 16:
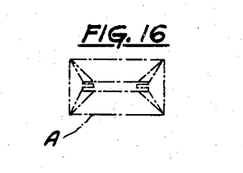
Fig. 16 is a diagrammatic plan view of the detail shown in Figs. 14 and 15.
Figure 17:
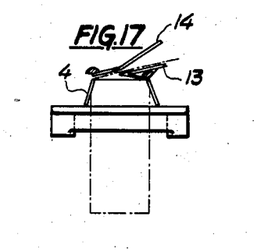
Fig. 17 is a view corresponding to Fig. 15 but showing the operating members in another position.
Figure 18:
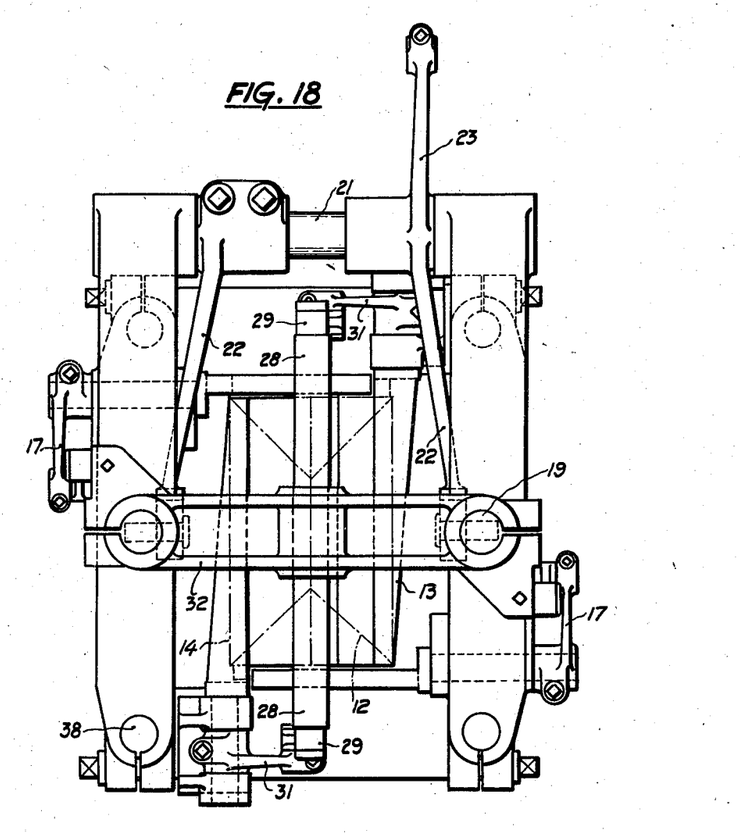
Fig. 18 is a plan view on a larger scale of the device shown in Fig. 13.

When the bag A has been moved up to the position shown in Figs. 14 and 15 the cam disc 26 moves the rod 24 upwards. Then the arms 22 move the spindles 19 and the yoke 32 downwards, so that the tucking flaps 12 are first folded inwardly down into the position shown in dash and dotted lines in Fig. 18, whereby the bag obtains the shape shown in Fig. 16. Thereafter, the rear collapsing flap 13 is moved downwardly to the position shown in Fig. 17, and thereupon the front flap 14 is moved down upon the flap 13, so that the bag end thus flattened has been laid down in a direction opposite to the direction of movement of the conveyor and the succeeding coiling direction, which imparts to the bag end a suitable starting position for the subsequent coiling, whereby vertical coiling movements are avoided. During the last part of the downward movement of the yoke 32 the arm 28 moves idly in the link slot 80, whereby the corresponding flap is held down by the spring 81. Now the lifting piston 3 is lowered with the filled bag, so that this rests anew upon the conveyor 1. The conveyor advances one step, whereby the rearwardly folded bag end is folded down under a bent guide plate 33 to the position shown in dash and dotted lines in Fig. 2, until the bag is in position in front of the coiling mechanism 34. There the bag end is retained in a downfolded position by means of a holding device comprising two downwardly bent plates 35. The plates 35 are secured to one end of a shaft 36, which is turnably journalled in a vertically adjustable bracket 37, secured to one of the columns 38. To the other end of the shaft 36 is secured an arm 39 pivotally connected to one end of a lever 40 by means of a link 41 (Figs. 4 and 5). The other end of the lever 40 is turnably journalled on a pin 42 in the machine frame, and it is given up and down movements by a cam disc 43 secured to the shaft 25, so that the plates 35 are swung between the end positions indicated in Figs. 2 and 9. The shaft 10 drives the shaft 25 by means of gear wheels 121 and 122.

Figure 6:
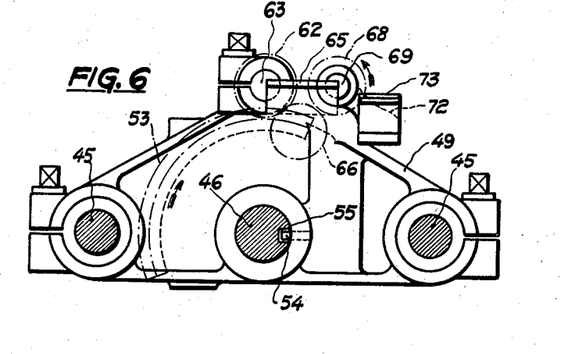
Fig. 6 is a front view partly in section of the coiling means on an enlarged scale.
Figure 6A:
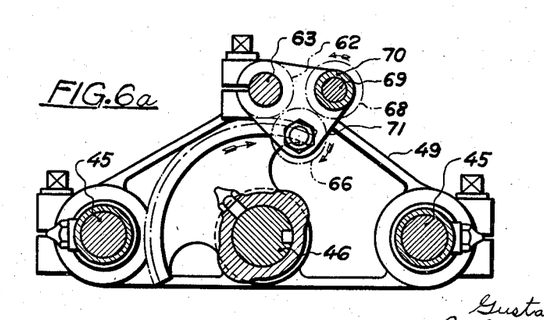
Fig. 6a is a sectional view taken on the line VIa—VIa of Fig. 8.
Figure 9:
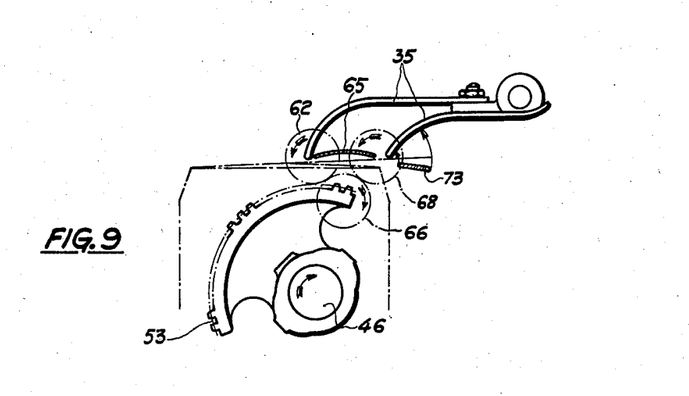
Figs. 9–11 illustrate different steps of the coiling procedure.

The coiling mechanism is supported by two brackets 44, connected to each other by means of two horizontal rods 45, so that it is operative substantially at the same level as the plate 33 and the holders 35 in their lower position. A shaft 46 is turnably journalled in the brackets 44 which are vertically secured to standards 47 in such a manner as to be adjustable in a vertical direction. A yoke 48 is displaceably mounted on the rods 45 and the shaft 46. To its rear end are pivotally connected two link rods 50, which, moreover, are pivoted to one end of an arm 52, turnably journalled at 51 in the frame. The arm 52 is actuated by a cam disc 85 which is secured to the driving shaft 10 and imparts periodical reciprocating movements to the arm and thereby to the yoke 48. Between the beams 49 of the yoke 48 and mounted on the shaft 46 is a toothed segment 53 (Fig. 6) which can follow the reciprocating movements of the yoke on the shaft 46 but not turn relatively to the same. It is provided with a transversal pin 54 which projects into a longitudinal groove 55 formed in the shaft 46. The toothed segment is normally held by the shaft 46 in the angular position shown in Figs. 6 and 9. Periodical reciprocating swinging movements can be imparted to the shaft 46 by means of an arm 56 (Fig. 4) secured to the rear end of said shaft, which arm is pivoted to a link rod 57, the length of which can be adjusted at 58. To the link rod 57 is imparted periodical movements up and down by a cam disc 59, rotated by a transmission 60 which is connected to the driving device of the machine and drives the cam disc shaft 61. The toothed segment 53 meshes with a pinion 62 which is loosely mounted on the shaft 63 which, in turn, is rotatably journalled in the yoke 48. To the front end of the shaft 63 is secured a laterally projecting arm 64, which supports a relatively thin, finger-shaped, slightly flute-shaped (Fig. 9) leg 65, which is normally positioned on a level with the shaft 63 (Figs. 6 and 9). The pinion 62 meshes with another pinion 66, which is loosely journalled on a pin 67, which is inserted into an arm 71 secured to the shaft 63. The pinion 66 meshes with a gear wheel 68, which is formed with a shaft 69. Said shaft is loosely journalled in a sleeve 70, which projects from the arm 71, parallel with the shaft 63. To the front end of the shaft 69 is secured an arm 72, to which is secured a relatively thin, finger-shaped leg 73, which extends parallel with the leg 65 and is normally positioned approximately on a level with or somewhat lower than the leg 65 (Figs. 6 and 9), and the axis of the shaft 69 coincides approximately with the rear edge of the leg 65. The axis of the shaft 63 coincides substantially with the front edge of the leg 65. The legs 65 and 73 are in operation slightly above the material supplied to the bag, i. e. approximately at the same level as the lower part of the guide plate 33.

Figure 7:
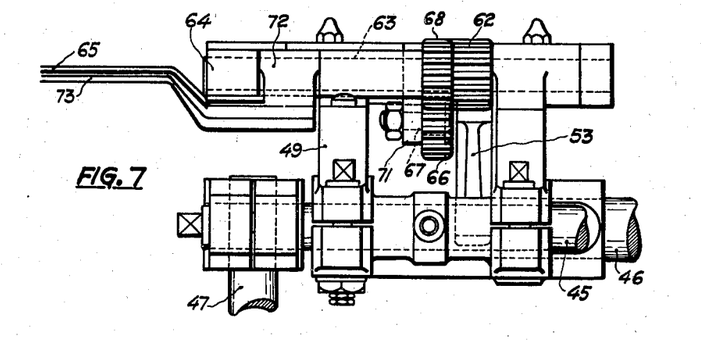
Figs. 7 and 8 are a side view and a plan view, respectively, of the coiling means on an enlarged scale.
Figure 8:
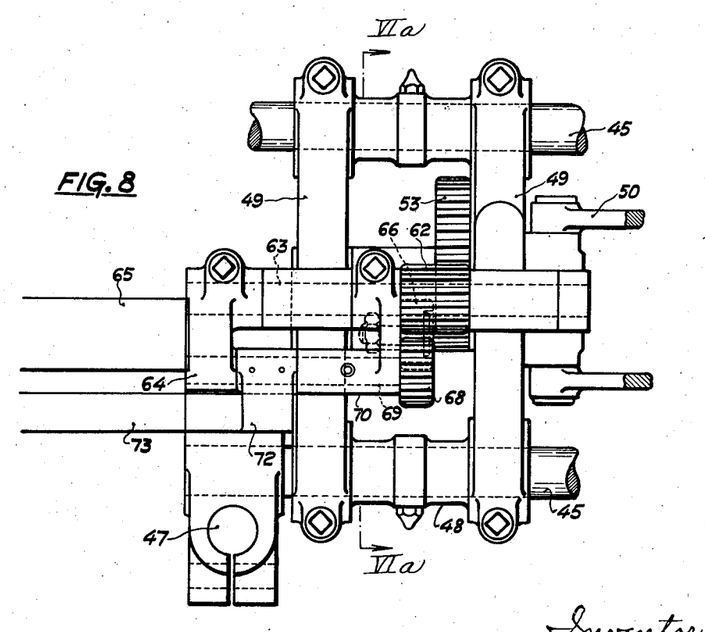
Figure 10:
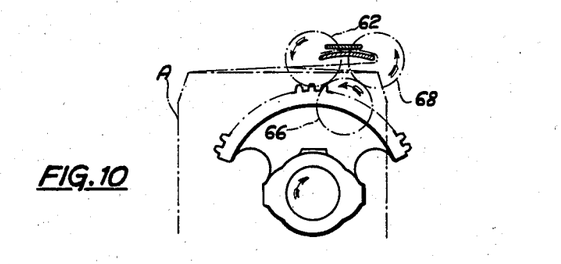
Figure 11:
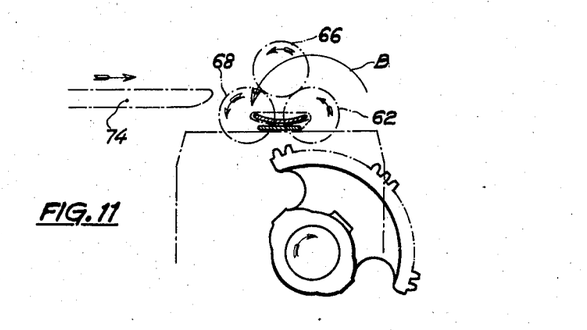

The coiling mechanism operates in the following manner:

The yoke 48 with the legs 65 and 73, in relative positions shown in Figs. 7–9, is advanced until the legs straddle the downfolded, flattened bag end (Fig. 9), whereby the leg 65 is inserted between the plates 35. As soon as the legs 65 and 73 have begun to straddle the bag end, in any case before the beginning of the coiling, the holder plates 35 are swung up into the position shown in Fig. 2. Thereafter the swinging movement of the shaft 46 in the direction of the arrow (Figs. 9–11) commences. The toothed segment 53 thereby imparts to the pinions 62 and 66 and the gear wheel 68 rotation in the direction of the arrows (Fig. 9), whereby the leg 73 is swung in laterally against the leg 65 on covering it and bending the outermost bag end (Figs. 9 and 10). Now the leg 65 forms a stop for the leg 73, and thereby the continued rotation of the gear wheel 68 is prevented. Therefore, the axis of rotation is transferred from the shaft 69 to the shaft 63, and the fork, consisting of the legs 65 and 73, now closed, will turn about the shaft 63 (in the direction B of Fig. 11), i. e. in the same direction as the arm 72 at its preceding turning movement, and thereby the bag end is coiled in the manner illustrated in Fig. 11. Thus the axis of rotation is suddenly transferred from the rear edge of the leg 65 to its front edge, wherefore the bag end is not subjected to inappropriate tension action during the coiling, and the coil folding takes place along predetermined creases.

Now a pair of depressing bars 74 are moved in the direction of the arrow (Fig. 1) into a position closely above the coiled bag fold. Thereafter the yoke 48 with the coiling fork is retracted, and the fork is opened by swinging back the toothed segment 53 when the legs are turned back into their initial positions.

The bars 74 are supported by two arms 75, which are turnably journalled in the frame, and impart to them parallel movements. The swinging movements of the arms 75 are effected by a cam disc 76 which is secured to the shaft 25, and against which an arm 77, rigidly secured to one of the arms 75, is held by a tension spring 78. When the closed bag is moved further to the sealing or banderoling mechanism, the bars 74 follow the latter and hold down the bag fold. When moving the bag into the sealing mechanism the coiled fold is depressed by a rear plate 115 on the bars 74.

The sealing mechanism 118 comprises a plate 120 which is secured to an up and down movable rod 86 in a position above the conveyor 1. The rod 86 is moved up and down by means of a link rod 87 connected to a lever arm 88 which is pivoted on a pin 91. The lever arm 88 is pivotally connected to an up and down movable rod 89 which is actuated by a cam disc 90 secured to the shaft 25. The rod 86 is slidably guided in another vertical rod 92 which is slidably mounted in the machine frame. The rod 92 carries a yoke 93 to which are pivotally connected two arms 94 the free ends of which carry each a roller 95. The rod 92 is by means of a link rod 109 connected to a lever arm 110 which is pivoted on a pin 112 in the machine frame. To the lever arm 110 is pivoted a rod 111 which is supported by a cam disc 113 which is secured to the shaft 25 and imparts to said rod periodical movements up and down. The sealing bands are supplied from the side by means of a pincher one leg 96 of which is fixed to and the other one 97 turnably journalled on a carriage 98, which can run to and fro on a bar 99, which is secured to standards 119. The bar 99 is on its under side provided with a bevelled projection 100, which in the working position shown in Fig. 19 depresses an arm 114, connected to the leg 97, and thereby opens the pincher. In the receiving position the pincher is opened by another projection 116, which actuates the arm 114. The carriage 98 is pivotally connected to a link rod 101, which is pivoted to an arm 103, turnable about a pin 102. A cam disc 104 secured to the shaft 25 imparts to a link 105 and the arm 103, pivotally connected to the same, swinging movements, so that the carriage 98 runs to and fro on the bar 99. The sealing bands are cut off from a string B, supplied from a reel 106.

Figure 19:
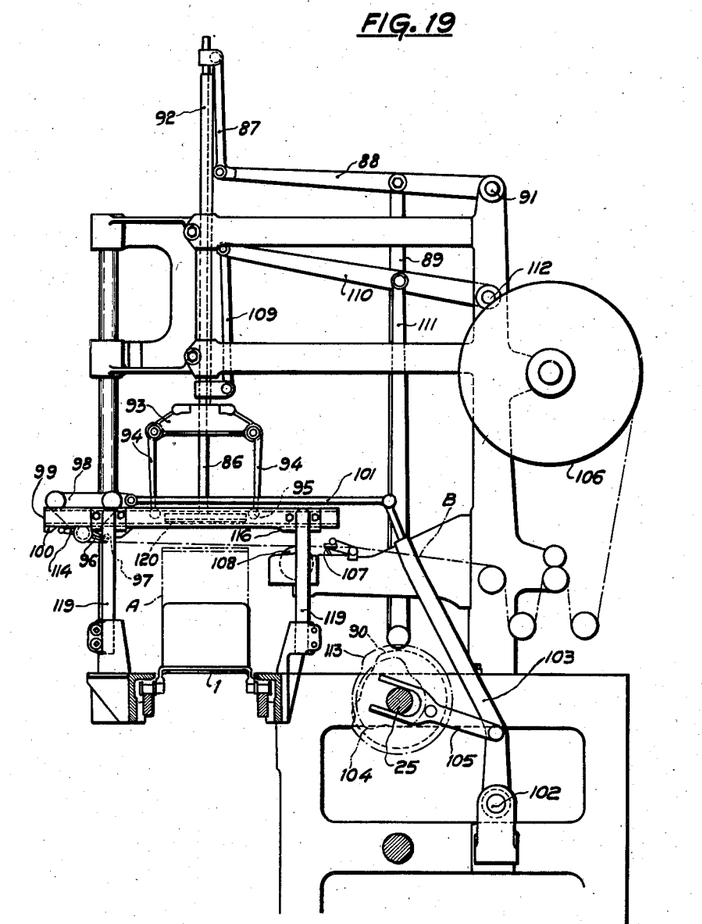
Fig. 19 shows an elevational section taken on the line XIX—XIX of Fig. 1.

When the pincher 96, 97 has pulled the band B over a paste roller 108 into the position shown in Fig. 19, the band is cut off by means of an upwardly movable knife 107, and the cut off band, supplied with paste on its under side, drops onto the very thin plate 115 which holds the coiled bag fold. Thereafter the plate 120 performs a short movement downwards and presses the band onto the plate 115 above the coiled bag fold. Also the rollers 95 are thereby moved downwards, and after the plate 120 has been arrested the rollers 95 continue their downward movement and roll on the bag ends on attaching them to the sides of the package. Thereafter, the bars 74 are moved to the right (Figs. 1 and 2) retracting the plate 115, so that the plate 120 presses the band onto the bag fold. Finally, after retracting the plate 120, the finished closed bag package is moved further to the left by the conveyor 1.

I claim:—

1. In a machine for closing bags, a conveyor movable intermittently along a longitudinal path and having means to advance bags which have the upper portions of their side walls flattened together, means for turning down and holding said flattened bag end in turned down position, means for coiling the turned down bag end, means for retaining the coiled bag end in a coiled condition, and means for sealing the coiled bag end, said turning and holding means, said coiling means, said retaining means, and said sealing means being spaced successively along the path of said conveyor to be operative above and substantially at the same distance from said conveyor to work into the sphere of one another upon the bag end, said retaining means being movable between said coiling means and said sealing means along the path of said conveyor.

2. In a machine for closing bags, a conveyor movable intermittently along a longitudinal path and having means to advance bags which have the upper portions of their side walls flattened together, means for turning down and holding said flattened bag end in turned down position, means for coiling the turned down bag end, means for retaining the coiled bag end in a coiled condition, and means for sealing the coiled bag end, said turning and holding means, said coiling means, said retaining means, and said sealing means being spaced successively along the path of said conveyor to be operative above and substantially at the same distance from said conveyor to work into the sphere of one another upon the bag end, said retaining means comprising a bar which is oscillatably movable between said coiling device and said sealing device along said longitudinal path of the conveyor.

3. In a machine for closing bags, a conveyor movable intermittently along a longitudinal path and having means to advance bags which have the upper portions of their side walls flattened together, means for turning down and holding said flattened bag end in turned down position, means for coiling the turned down bag end, means for retaining the coiled bag end in a coiled condition, and means for sealing the coiled bag end, said turning and holding means, said coiling means, said retaining means, and said sealing means being spaced successively along the path of said conveyor to be operative above and substantially at the same distance from said conveyor to work into the sphere of one another upon the bag end, said retaining means being movable between said coiling means and said sealing means along said longitudinal path of the conveyor and comprising a thin plate which is movable into and out of said sealing device.

4. In a machine for closing bags, a conveyor movable intermittently along a longitudinal path and having means to advance bags which have the upper portions of their side walls flattened together, means for turning down and holding said flattened bag end in turned down position, and means for coiling the turned down bag end, said turning and holding means and said coiling means being spaced successively along the path of said conveyor to be operative above and substantially at the same distance from said conveyor, and said coiling means being operative to catch the bag end before said end is released by said holding means.

5. In a machine for closing bags, a conveyor movable intermittently along a longitudinal path and having means to advance bags which have the upper portions of their side walls flattened together, means for turning down and holding a flattened bag end in turned down position in a direction opposite to the direction of movement of said conveyor, and means for coiling the turned down bag end, said turning and holding means and said coiling means being spaced successively along the path of said conveyor to be operative above and substantially at the same distance from said conveyor, and said coiling means being operative to catch the bag end before said end is released by said holding means.

6. In a machine for closing bags, a conveyor movable intermittently along a longitudinal path and having means to advance bags which have the upper portions of their side walls flattened together, means for turning down and holding a flattened bag end in turned down position, means for coiling the turned down bag end, means for retaining the coiled bag end in a coiled condition, and means for sealing the coiled bag end, said turning and holding means, said coiling means, said retaining means, and said sealing means being spaced successively along the path of said conveyor to be operative above and substantially at the same distance from said conveyor to work into the sphere of one another to act upon the bag end.

7. In a machine for closing bags, a conveyor movable intermittently along a longitudinal path and having means to advance bags which have the upper portions of their side walls flattened together, means for turning down and holding a flattened bag end in turned down position, and means for coiling the turned down bag end, said turning and holding means and said coiling means being spaced successively along the path of said conveyor to be operative above and substantially at the same distance from said conveyor, and said coiling means being movable transversely to the direction of extent of said conveyor into operative position to catch the bag end before said end is released by said holding means.

8. In a machine for closing bags, a conveyor movable intermittently along a longitudinal path and having means to advance bags which have the upper portions of their side walls flattened together, means for turning down and holding a flattened bag end in turned down position in a direction opposite to the direction of movement of said conveyor, and means for coiling the turned down bag end in the feeding direction of said conveyor, said turning and holding means and said coiling means being spaced successively along the path of said conveyor to be operative above and substantially at the same distance from said conveyor, said coiling means being operative to catch the bag end before said end is released by said holding means, said turning means comprising a stationary guide positioned above said conveyor to turn down the bag end in transit.

9. In a machine for closing bags, a conveyor movable intermittently along a longitudinal path and having means to advance bags which have the upper portions of their side walls flattened together, means for turning down and holding a flattened bag end in turned down position, and means for coiling the turned down bag end, said turning and holding means and said coiling means being spaced successively along the path of said conveyor to be operative above and substantially at the same distance from said conveyor, said coiling means being operative to catch the bag end before said end is released by said holding means, said holding means comprising a member which is movable into and out of operative position opposite to said coiling means and is operatively connected to said coiling means to release the bag end when said coiling means is put into operation.

GUSTAF ÖRSTRÖM.